United States Patent
Beckley et al.

(10) Patent No.: US 6,854,794 B2
(45) Date of Patent: Feb. 15, 2005

(54) CROSS CAR DUCT WITH INTEGRATED MODE DOORS AND HVAC MODULE

(75) Inventors: Daniel V. Beckley, Fenton, MI (US); Martin Burke, Howell, MI (US); Jeffrey L. Soncrant, Sterling Heights, MI (US)

(73) Assignee: Magna Interior Systems, Inc., Aurora (CA)

( * ) Notice: Subject to any disclaimer, the term of this patent is extended or adjusted under 35 U.S.C. 154(b) by 0 days.

(21) Appl. No.: 10/221,053

(22) PCT Filed: Mar. 16, 2001

(86) PCT No.: PCT/CA01/00343

§ 371 (c)(1),
(2), (4) Date: Jan. 13, 2003

(87) PCT Pub. No.: WO01/68391

PCT Pub. Date: Sep. 20, 2001

(65) Prior Publication Data

US 2004/0212211 A1 Oct. 28, 2004

Related U.S. Application Data

(60) Provisional application No. 60/190,424, filed on Mar. 17, 2000.

(51) Int. Cl.⁷ .............................................. B60R 27/00
(52) U.S. Cl. ............................ 296/208; 296/70; 180/90
(58) Field of Search ..................... 296/208, 70; 180/90; 280/782; 454/90

(56) References Cited

U.S. PATENT DOCUMENTS

| | | | | |
|---|---|---|---|---|
| 2,655,092 A | * | 10/1953 | Spooner .................... | 454/109 |
| 4,733,739 A | | 3/1988 | Lorenz et al. | |
| 5,354,114 A | | 10/1994 | Kelman et al. | |
| 5,364,159 A | | 11/1994 | Kelman et al. | |
| 5,556,153 A | | 9/1996 | Kelman et al. | |
| 5,564,515 A | | 10/1996 | Schambre | |
| 5,619,862 A | | 4/1997 | Ruger et al. | |
| 5,653,386 A | * | 8/1997 | Hennessee et al. ........... | 454/75 |
| 5,709,601 A | | 1/1998 | Heck | |
| 5,934,744 A | | 8/1999 | Jergens et al. | |
| 5,979,965 A | * | 11/1999 | Nishijima et al. ............ | 296/70 |
| 6,073,987 A | * | 6/2000 | Lindberg et al. .............. | 296/70 |
| 6,203,092 B1 | * | 3/2001 | Yoshinaka ................... | 296/70 |
| 6,234,569 B1 | * | 5/2001 | Derleth et al. ................ | 296/70 |
| 6,273,495 B1 | * | 8/2001 | Haba et al. ................... | 296/70 |
| 6,464,280 B1 | * | 10/2002 | Shibata et al. ............... | 296/70 |
| 6,487,525 B1 | * | 11/2002 | Hall et al. ..................... | 703/7 |

\* cited by examiner

*Primary Examiner*—Lori L. Coletta
(74) *Attorney, Agent, or Firm*—Clark Hill PLC

(57) ABSTRACT

A cross car duct for use in an instrument panel assembly of an automotive vehicle includes an upper beam of one piece molded plastic extending longitudinally between opposing A-pillars of the vehicle. The cross car duct also includes a lower beam of one piece molded plastic attached to the upper beam and extending longitudinally between the A-pillars. A magnesium steering column support for supporting conventional steering components on the cross car duct is fixedly secured to the upper beam. The upper beam includes a plurality of air ducts and the lower beam includes a plurality of air openings aligned with the air ducts for passing air through the beams. The lower beam also includes a housing for supporting an HVAC module. The cross car duct further includes a plurality of integrated mode doors and actuators operatively connected to the housing of the lower beam for actuation between an open position spaced from the air openings and a closed position covering the air openings in the lower beam. The HVAC module includes a lower casing integrated with the housing of the lower beam for supporting and enclosing the mode doors and the components of the HVAC module in the lower beam forming a cross car duct with integrated mode doors and an integral HVAC module.

14 Claims, 4 Drawing Sheets

CROSS CAR DUCT WITH INTEGRATED MODE DOORS AND HVAC MODULE

This application claims benefit of provisional application No. 60/190,424 filed Mar. 17, 2000.

FIELD OF THE INVENTION

The present invention relates generally to a cross car duct for an automotive instrument panel assembly, and more particularly, to a cross car duct having a magnesium structural steering column support, integrated mode doors, and a heating, ventilating, and air conditioning module for the instrument panel assembly.

BACKGROUND OF THE INVENTION

Automotive vehicles typically include an instrument panel assembly secured between a pair of vertical stanchions, or A-pillars, along opposite sides of the vehicle and in front of the passenger and/or driver compartment of the vehicle. The instrument panel assembly commonly supports a plurality of components such as radio units, steering components, glove box components, gauges, and a heating, ventilating and air conditioning unit (HVAC unit). Instrument panel assemblies are commonly constructed by one or more magnesium, steel or plastic molded cross car beams extending between the A-pillars for supporting the various instrument panel components and providing structural rigidity between the A-pillars. The plastic molded beams may include channels and openings for receiving and supporting the various components therein.

The HVAC unit commonly comprises an upper casing and a lower casing for housing the HVAC components such as an evaporator core, filter, heater core and actuated valves and mode doors for directing the flow of air from the HVAC unit through selective openings in the upper and lower casings. The HVAC unit is fixedly secured to the cross car beams. However, the openings in the upper and lower casings of the HVAC unit must be aligned with openings in the beams in order to circulate and direct the flow of air from the HVAC unit through the beams and into the vehicle compartment.

Therefore, it is desirable to provide a structural plastic cross car beam having integrated air ducts for circulating air therethrough and to integrate the components of the HVAC unit into the structural beams to decease the number of parts, weight and assembly complexity of the instrument panel.

SUMMARY OF THE INVENTION

According, the present invention relates to a cross car duct for use in an instrument panel assembly of an automotive vehicle comprising a contoured upper beam extending longitudinally between a first end and a second end and having a plurality of air ducts forming air outlets. The cross car duct further includes a contoured lower beam extending longitudinally between a first end and a second end and attached to the upper beam between the respective first and second ends. The lower beam has a plurality of air openings aligned with the air ducts of the upper beam. The cross car duct also includes at least one mode door operatively connected to the lower beam adjacent at least one of the air openings and at least one actuator secured to the lower beam for actuating the mode door between a closed position covering the air opening and an opened position spaced from the air opening for opening the air opening to allow passage of air therethrough. The cross car duct additionally includes a heat, ventilating and air conditioning module secured to the lower beam for circulating ambient air through selective air openings and air ducts dependent on the actuator controlling the actuation of the mode door between the opened and closed positions.

DETAILED DESCRIPTION OF THE PREFERRED EMBODIMENT

Figure 1:
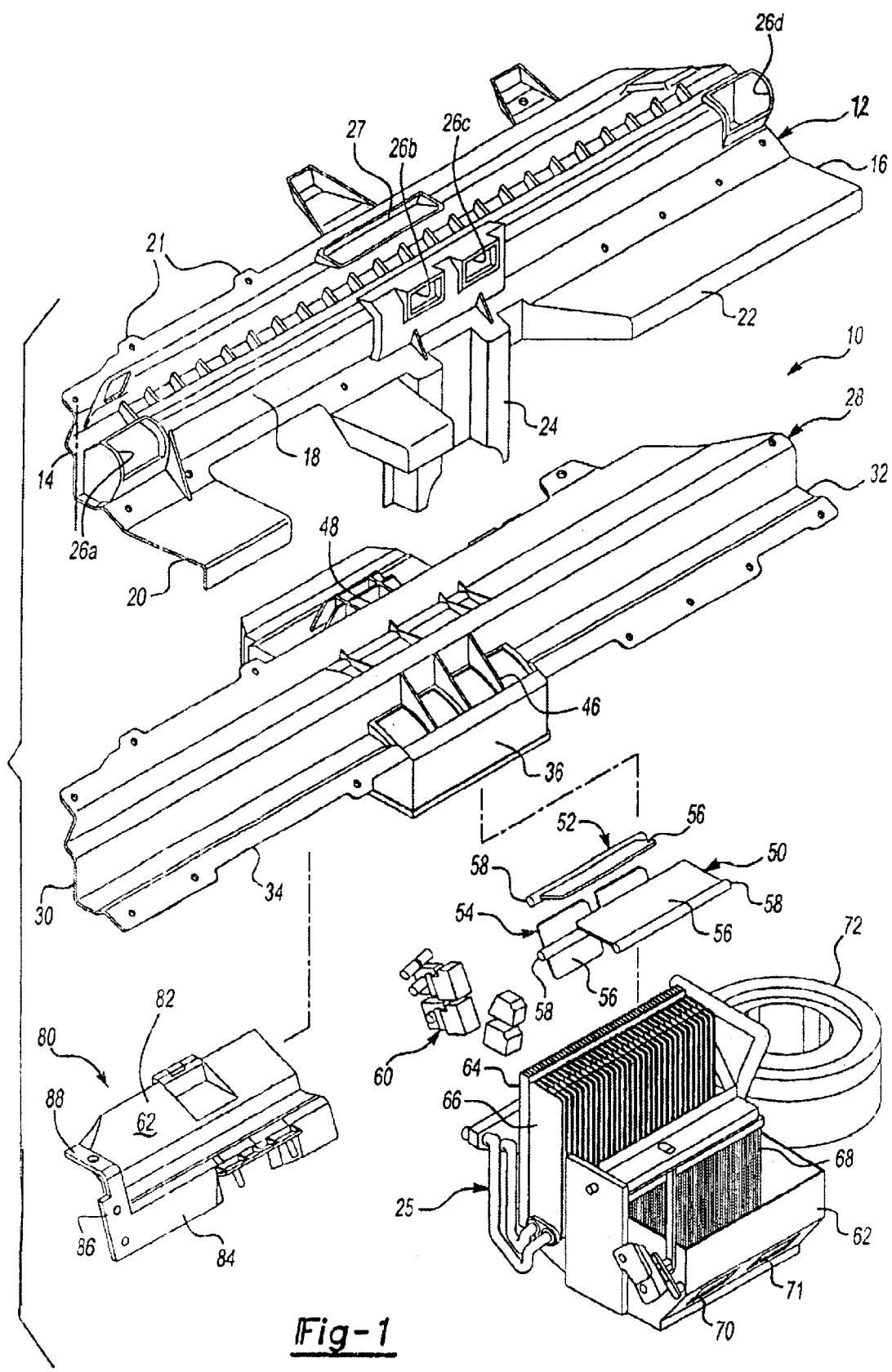
FIG. 1 is a partially exploded perspective view of the subject invention.

Referring to the Figures, a cross car duct for use in instrument panel assembly of an automotive vehicle is generally depicted at 10 in FIG. 1. The cross car duct 10 includes a contoured upper beam 12 extending longitudinally between a first end 14 and a second end 16 opposite the first end 14. The upper beam 12 is constructed of a one piece, injection molded or compression formed plastic, such as a thermoplastic, thermoset, filled or reinforced plastic. The upper beam 12 includes a thin walled main body portion 18 having a generally S-shaped cross-section. A plurality of mounting flanges 20, 21, 22, project outwardly from the main body portion 18 for securing and supporting components of the instrument panel assembly, such as steering components, glove box components, etc. A mounting flange 24 projects downwardly from the main body portion for securing and supporting a heating, ventilating and air conditioning unit, or HVAC module, as shown at 25 and as will be described in further detail hereinbelow. The upper beam 12 further includes a plurality of front air ducts 26a–d and a rear air duct 27 defined by openings in the main body portion 18 forming air outlets.

The cross car duct 10 further includes a contoured lower beam 28 extending longitudinally between a first end 30 and a second end 32 for supporting components of the heating, ventilating and air conditioning unit 25. The lower beam 28 is also constructed of a one piece, injection molded or compression formed plastic, such as a thermoplastic, thermoset, filled or reinforced plastic. The lower beam 28 includes a thin wall main body portion 34 also having a generally S-shaped configuration for mating alignment and engagement with the upper beam 12 between the respective first ends 14, 30 and second ends 16, 32. More specifically, the lower beam 28 is bonded or fixedly secured, such as by vibration welds, to the upper beam 12 to longitudinally align the respective first ends 14, 30 and the second ends 16, 32. The contours of the mating upper 12 and lower 28 beams define air channels 31, 33 extending longitudinally between the respective first and second ends to allow pass-flow of air therealong.

Figure 2:
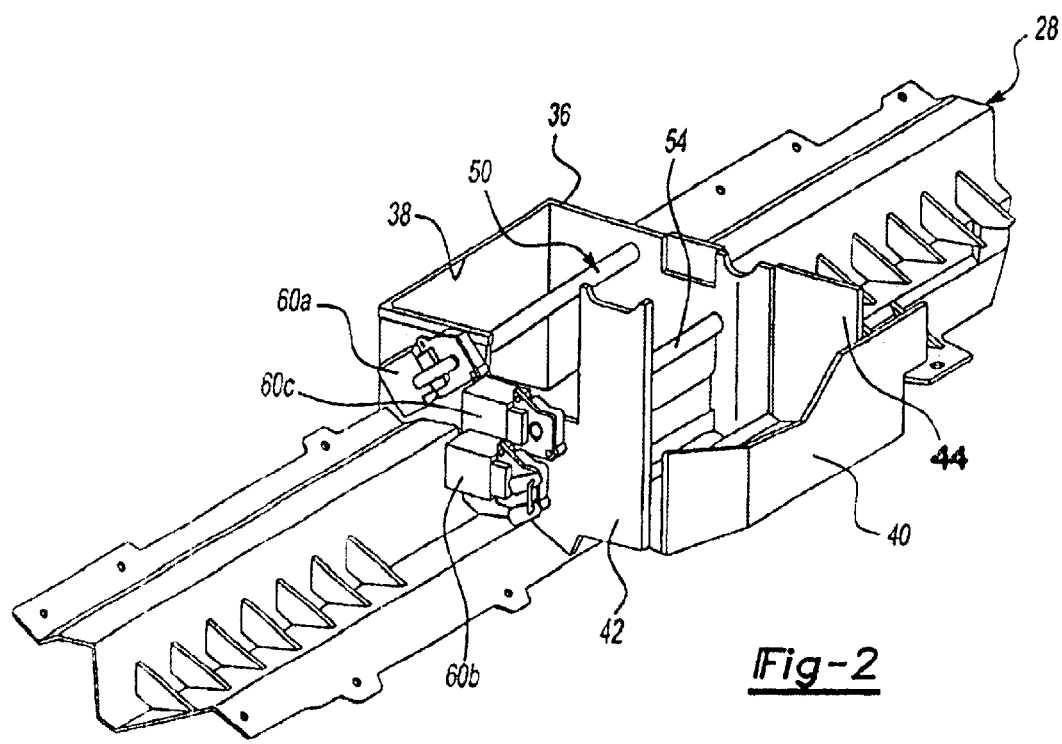
FIG. 2 is a bottom view of a lower beam of the cross car duct and the integrated mode doors.

A generally rectangular housing 36 extends downwardly from the main body portion 34 for cooperating with and enclosing the upper portion of the HVAC module 25. Referring to FIG. 2, the underside of the lower beam 28 is shown. The housing 36 is shown including a planar front wall 38, rear wall 40 and parallel side walls 42, 44 extending between the front wall 38 and rear wall 40.

Referring again to FIG. 1, the lower beam 28 further includes a plurality of front air openings 46 passing through the main body portion 34 and aligned with the openings formed by the respective plurality of front air ducts 26b and 26c in the upper beam 12. The lower beam 28 also includes a rear opening 48 passing through the main body portion 34 and aligned with the openings formed by the rear air duct 27 in the upper beam 12.

The cross car duct 10 also includes a plurality of mode doors 50, 52 and 54 operatively connected to the lower beam 26 adjacent to the air openings 46, 48. More specifically, referring to FIGS. 1, 2 and 3, each mode door, 50, 52, 54 includes a generally flat panel 56 extending outwardly from a pivot rod 58. The pivot rod 58 of each mode door 50, 52, 54 is pivotally connected between the opposing and parallel side walls 42, 44 of the housing 36. The mode door 50, or front door, is pivotally secured to the housing 36 immediately adjacent the front air openings 46. The mode door 52, or defrost door, is pivotally secured to the housing 36 immediately adjacent the rear air opening 48. Finally, the mode door 54, or bypass door, is pivotally secured to the housing 36 below the rear air opening 48 and defrost door 52. Each of the mode doors 50, 52, 54 pivot between an open position and a closed position for controlling the flow of air from the HVAC module 25 through the beams 12, 28 as will be described in greater detail below.

The cross car duct 10 also includes a plurality of actuators 60 secured to the lower beam for actuating the mode doors 50, 52, 54 between the closed position covering the air openings 46, 48 and the opened position spaced from the air openings 46, 48 to allow air from the HVAC module 25 to pass through the air ducts 26a–d, 27 and into the vehicle compartment. More specifically, referring to FIGS. 2 and 3, a first actuator 60a is operatively connected to the front mode door 50 for pivoting the mode door 50 between the closed position covering the front air openings 46 and the opened position allowing passage of air through the front air openings 46 and the front air ducts 26a–d. A second actuator 60b is similarly operatively connected to the defrost mode door 52 for pivoting the door 52 between the closed position covering the rear opening 48 and the opened position allowing passage of air through the rear opening 48 and rear air duct 27. A third actuator 60c is operatively connected to the bypass mode door 54 for pivoting the door 54 between a closed position extending between the HVAC module 25 and the defrost mode door 52 for preventing passage of air directly to the openings 46, 48 and an opened position spaced from the defrost mode door 52 and opening 48 to allow passage of air to the openings 46, 48.

Figure 3:
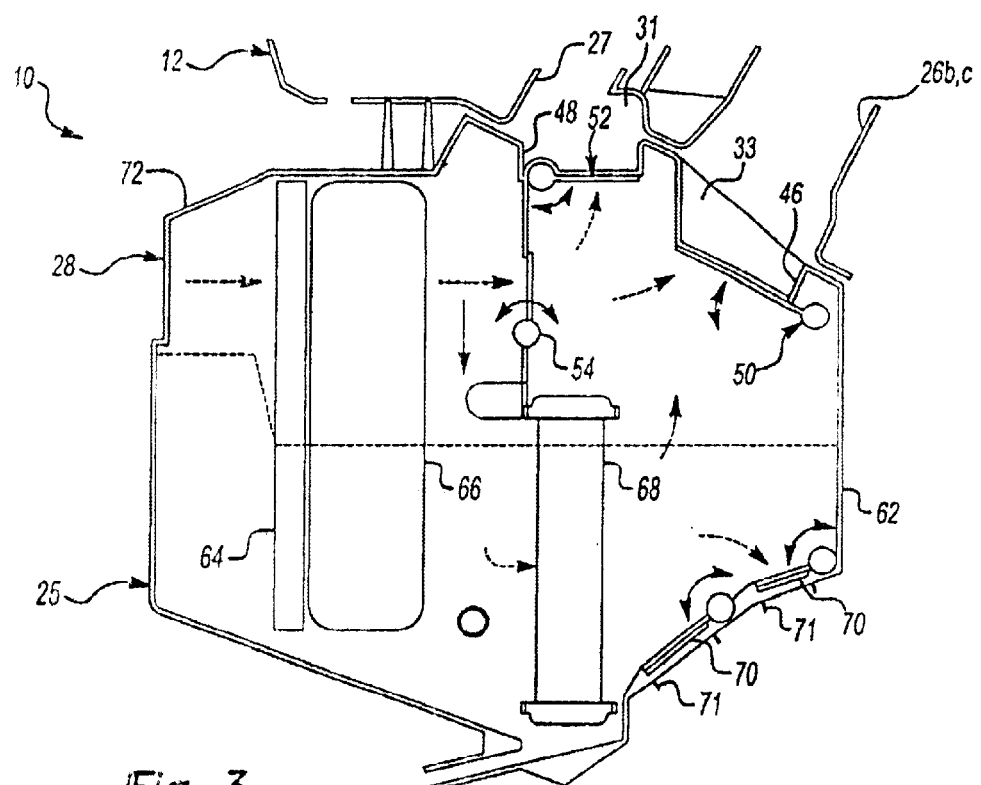
FIG. 3 is a cross-sectional view of the cross car duct with integrated mode doors and HVAC module.
Figure 4:
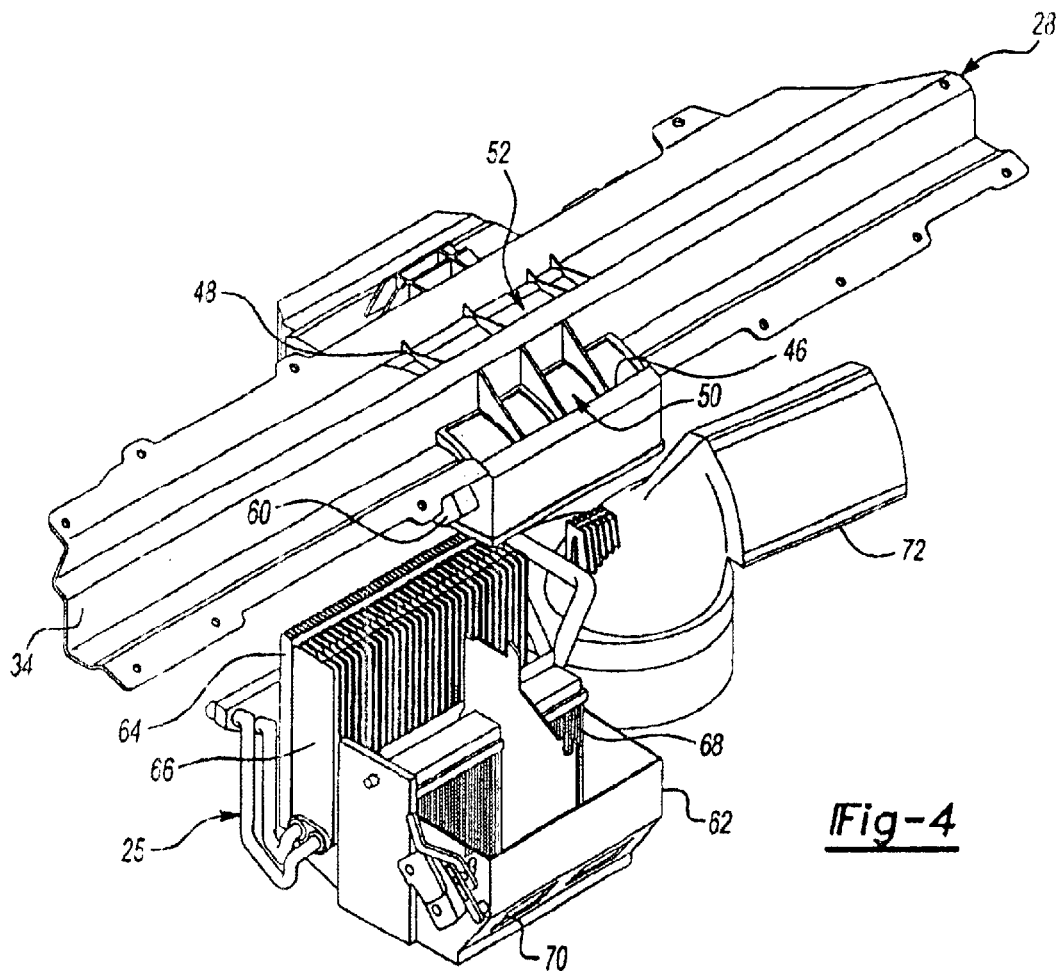
FIG. 4 is a partially exploded perspective view of the lower beam and HVAC module.

Referring to FIGS. 3 and 4, the cross car duct 10 additionally includes a heating, ventilating and air conditioning unit, or HVAC module, 25 for conditioning and circulating ambient air through selective air opening 46, 48 and air ducts 26a–d, 27 dependent on the actuators 60 controlling the actuation of the mode doors 50, 52, 54 between the opened and closed positions. The HVAC module 25 includes a lower casing 62 for engaging and closing the housing 36 in the lower beam 28. The HVAC module 25 is secured to the housing 36 of the lower beam 28 forming an enclosure between the lower casing 62 and the housing 36. The HVAC module 25 includes a plurality of components commonly known in the art, which are thus enclosed between the lower casing 62 and the housing 36 and integrated with the lower beam 28. The HVAC module 25 includes a filter 64, an evaporator 66 attached to the filter 64, a heater core 68 extending between the bottom of the lower casing 62 and the bypass mode door 54, and a plurality of lower mode doors and actuators 70 in the casing for opening and closing passageways 71 in the lower casing 62. The HVAC module 25 further includes a fresh air inlet 72 for supplying fresh ambient air to the HVAC module 25.

The cross car duct 10 further includes a magnesium steering column support 80 die cast by conventional manufacturing methods for supporting conventional steering components on the cross car duct 10. The support 80 includes an upper plate 82 and a front plate 84. The support 80 generally conforms to the contour of the upper beam 12 and is fixedly secured thereto by fastening the plates 82, 84 to the mounting flanges 20, 21. The support 80 further includes mounting brackets 86, 88 for fixedly securing the support 80 to the vehicle structure to provide additional support to the steering components.

In operation, referring to FIG. 3, ambient air is drawing into the HVAC module 25 through the air inlet 72. The air passes through the filter 64 and evaporator 62 to condition the air. If the HVAC module 25 is in a heating condition, the bypass mode door 54 is closed by the actuator 60c and the air passes through the heater core 68. The actuators 60a, 60b control the opening of the front mode door 50 and defrost mode door 52, respectively, between the opened and closed positions based on operator selection to circulate the heated air through the air openings 46, 48 and air ducts 26a–d, 27 of the beams 12, 28. The heated air may also flow through the passageways 71 in the lower casing 62 by actuation of the actuators and lower mode doors 70. If the HVAC module 25 is in a ventilating or air conditioning condition, the bypass mode door 54 is opened by the actuator 60c and the air bypasses the heater core 68 to the various selected air openings 46, 48 and air ducts 26a–d.

Figure 5:
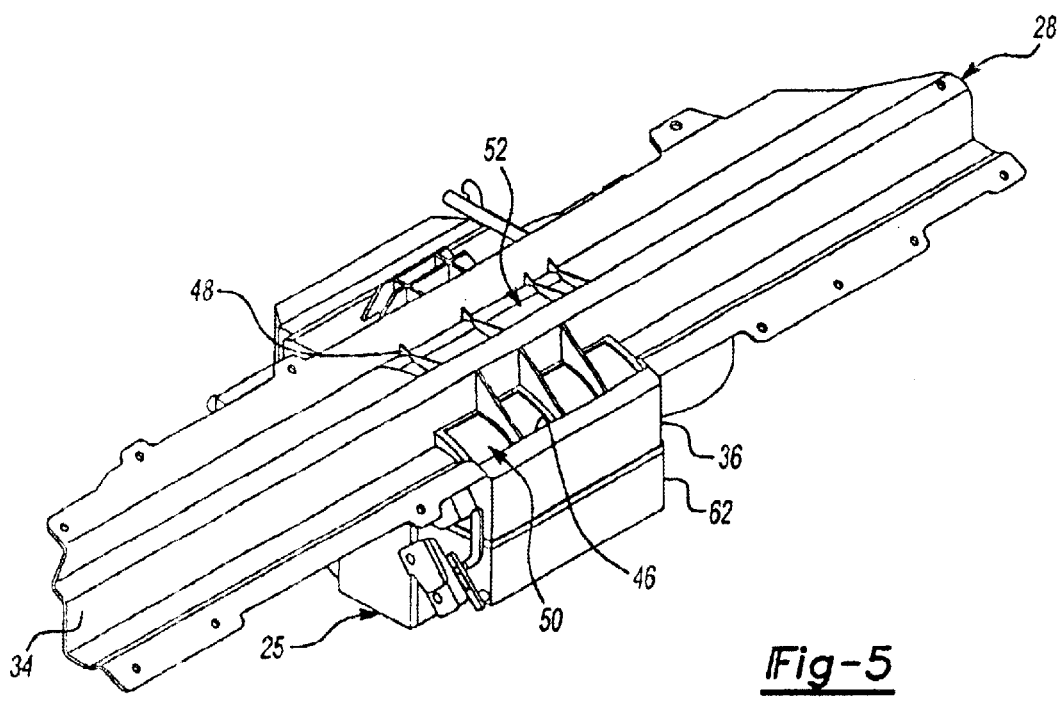
FIG. 5 is an assembled view of FIG. 4.
Figure 6:
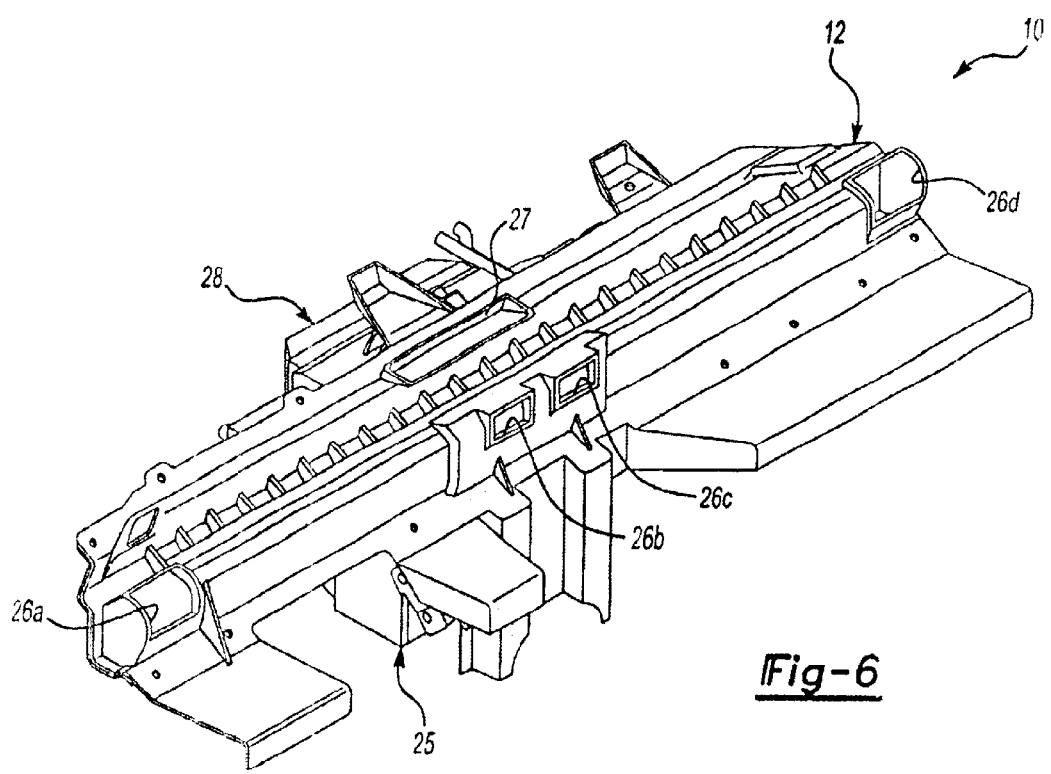
FIG. 6 is an assembled view of FIG. 1.

FIG. 4 discloses the mode doors 50, 52, 54 attached to the housing 36 of the lower beam 28 and the HVAC module 25 positioned below the lower beam 28 for mating engagement and attachment with the housing 36. FIG. 5 discloses the mode doors 50, 52, 54 and the HVAC module integrally attached to the housing 36 of the lower beam 28. Finally, FIG. 6 discloses the completely assembly cross car duct 10 with integrated mode doors 50, 52, 54 and HVAC module 25.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practice other than as specifically described.

We claim:

1. A cross car duct for use in an instrument panel assembly of an automotive vehicle comprising:

a contoured upper beam extending longitudinally between a first end and a second end and having a plurality of air ducts forming air outlets;

a contoured lower beam extending longitudinally between a first end and a second end and attached to said upper beam between said respective first and second ends, said lower beam having a plurality of air openings aligned with said air ducts of said upper beam;

an air channel formed between said upper beam and said lower beam for supplying air to each of said air ducts and said air openings;

a steering column support affixed to said upper beam and adapted to be directly attached to the vehicle and to support steering components of the vehicle;

a mode door operatively connected to said lower beam adjacent at least one of said air openings;

an actuator secured to said lower beam and operably connected to said mode door for actuating said mode door between a closed position covering said air opening and an opened position spaced from said air opening for opening said air opening to allow passage of air; and a heat, ventilating and air conditioning (HVAC) module secured to said lower beam for circulating ambient air through selective ones of said air openings and said air ducts dependent on said actuator controlling said actuation of said mode door between said opened and closed positions.

2. A cross car duct as set forth in claim 1 wherein each of said upper beam and said lower beam is formed of plastic.

3. A cross car duct as set forth in claim 2 wherein said lower beam includes a thin wall main body portion supporting a housing and said HVAC module including a lower casing for mating with said housing for securing and enclosing said HVAC module with said lower beam.

4. A cross car duct as set forth in claim 3 wherein said upper beam includes a thin wall main body potion supporting a mounting flange for fixedly securing and supporting said HVAC module to said upper beam.

5. A cross car duct as set forth in claim 4 wherein said upper beam includes a plurality of front air ducts defining air openings in fluid communication with a first air channel between said upper and lower beams and a rear air duct defining an air opening in fluid communication with a second air channel between said upper and lower beams.

6. A cross car duct as set forth in claim 5 wherein said lower beam includes a plurality of front air openings aligned with said front air ducts and in fluid communication with said first air channel and a rear air opening aligned with said rear air duct and in fluid communication with said second air channel.

7. A cross car duct as set forth in claim 6 further including a plurality of mode doors pivotally supported by said housing of said lower beam for opening and closing said front and rear air openings to the passage of fluid therethrough.

8. A cross car duct as set forth in claim 7 wherein said HVAC module includes an air inlet for supplying air through said HVAC module to each of said air openings and air ducts in said respective lower and upper beams.

9. A cross car duct as set forth in claim 8 wherein said HVAC module includes a filter, evaporator and heater core supported and encased by said lower casing for conditioning air received from said air inlet prior to the air flowing through said air opening and air ducts.

10. A cross car duct as set forth in claim 9 wherein said steering column support is a magnesium die cast.

11. A cross car duct for use in an instrument panel assembly of an automotive vehicle comprising:

a contoured upper beam extending longitudinally between a first end and a second end and having a plurality of air ducts forming air outlets;

a contoured lower beam extending longitudinally between a first end and a second end and attached to said upper beam between said respective first and second ends, said lower beam having a plurality of air openings aligned with said air ducts of said upper beam;

said upper beam including a plurality of front air ducts defining air openings in fluid communication with a first air channel formed between said upper and lower beams and a rear air duct defining an air opening in fluid communication with a second air channel formed between said upper and lower beams;

a steering column support affixed to said upper beam and adapted to support steering components of the vehicle;

a mode door operatively connected to said lower beam adjacent at least one of said air openings;

an actuator secured to said lower beam and operably connected to said mode door for actuating said mode door between a closed position covering said air opening and an opened position spaced from said air opening for opening said air opening to allow passage of air; and a heat, ventilating and air conditioning (HVAC) module secured to said lower beam for circulating ambient air through selective ones of said air openings and said air ducts dependent on said actuator controlling said actuation of said mode door between said opened and closed positions.

12. A cross car duct as set forth in claim 11 wherein said lower beam includes a plurality of front air openings aligned with said front air ducts and in fluid communication with said first air channel and a rear air opening aligned with said rear air duct and in fluid communication with said second air channel.

13. A cross car duct as set forth in claim 12 further including a plurality of mode doors pivotally supported by said housing of said lower beam for opening and closing said front and rear air openings to the passage of fluid therethrough.

14. A cross car duct as set forth in claim 13 wherein said HVAC module includes an air inlet for supplying air through said HVAC module to each of said air openings and air ducts in said respective lower and upper beams.

* * * * *